Figure 1:
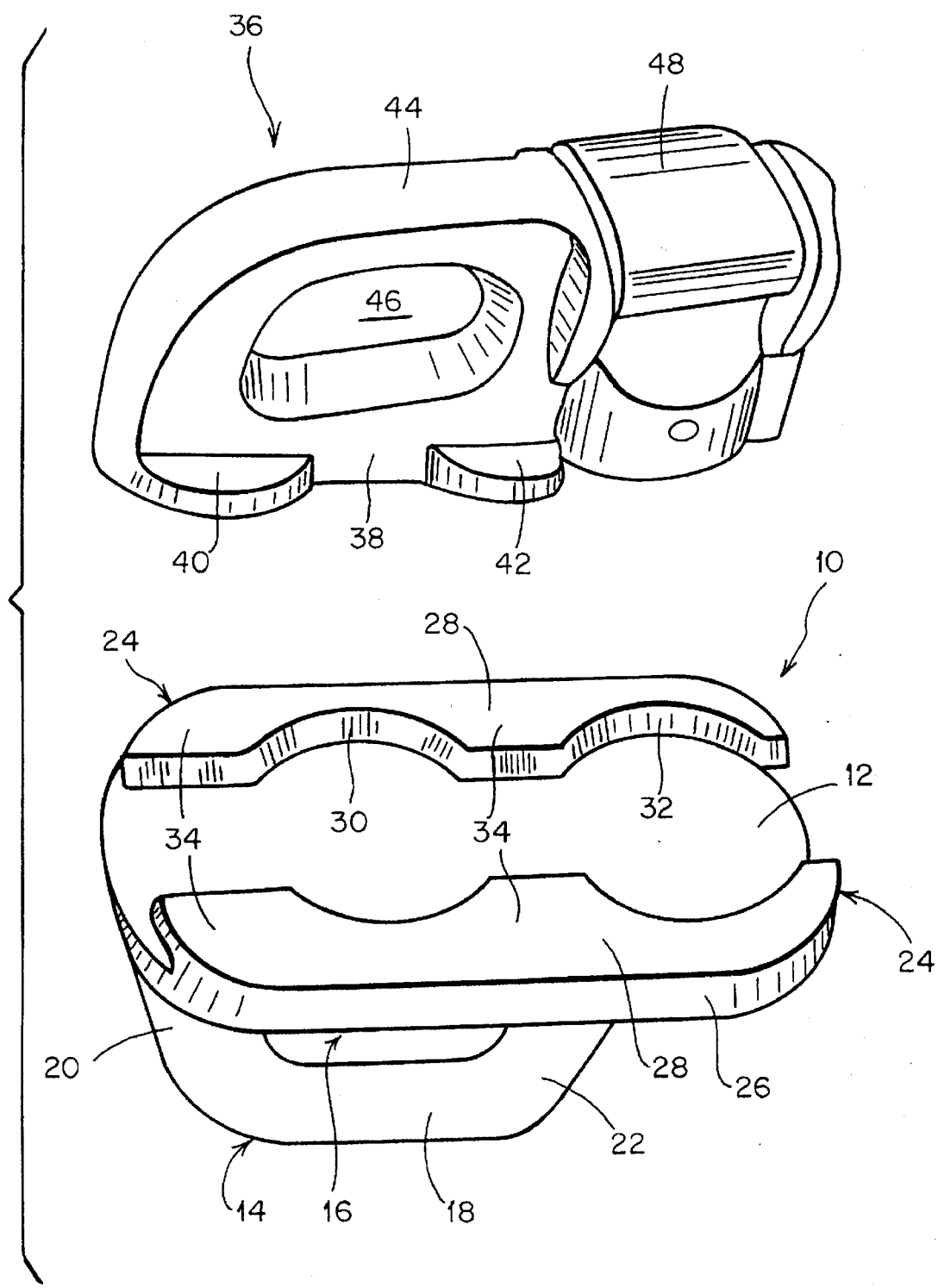

United States Patent [19]

Berrezouga

[11] Patent Number: 5,625,926
[45] Date of Patent: May 6, 1997

[54] EXTENSION FITTING FOR A TENSION BELT

[75] Inventor: Ridha Berrezouga, Walldorf, Germany

[73] Assignee: Ribeco GmbH, Walldorf, Germany

[21] Appl. No.: 338,589

[22] PCT Filed: Mar. 14, 1994

[86] PCT No.: PCT/DE94/00275

§ 371 Date: Jan. 18, 1995

§ 102(e) Date: Jan. 18, 1995

[87] PCT Pub. No.: WO94/20329

PCT Pub. Date: Sep. 15, 1994

[30] Foreign Application Priority Data

Mar. 12, 1993 [DE] Germany ............... 9303666 U

[51] Int. Cl.⁶ ............... A44B 21/00; B60P 7/00
[52] U.S. Cl. ............... 24/265 CD; 24/68 CD; 24/68 E; 24/597; 410/105
[58] Field of Search ........... 24/265 CD, 68 CD, 24/68 E, 194, 663, 597, 302; 410/405, 406, 407, 408, 409, 410, 411, 416

[56] References Cited

U.S. PATENT DOCUMENTS

| | | | |
|---|---|---|---|
| 1,764,044 | 6/1930 | Hoffman | 24/597 |
| 2,743,684 | 5/1956 | Eisner . | |
| 3,332,123 | 7/1967 | Nori Higuchi | 24/265 CD |
| 3,344,749 | 10/1967 | Bass et al. | 410/105 |
| 3,537,148 | 11/1970 | Carlmark | 24/68 E |
| 3,605,637 | 9/1971 | Prete, Jr. . | |
| 4,020,770 | 5/1977 | McLennan et al. | 410/105 |
| 4,273,487 | 6/1981 | McLennan | 410/105 |
| 4,796,837 | 1/1989 | Dowd | 410/105 |

FOREIGN PATENT DOCUMENTS 2839305  3/1980  Germany .
787750  12/1957  United Kingdom .

Primary Examiner—Victor N. Sakran
Attorney, Agent, or Firm—Galgano & Burke

[57] ABSTRACT

A mounting is disclosed for lengthening a clamping strap on which is arranged a strap tie element which may detachably engage the holding profile of a counterpiece. The mounting consists of a plate provided with the holding profile and of a ring for inserting the lengthening strap.

9 Claims, 4 Drawing Sheets

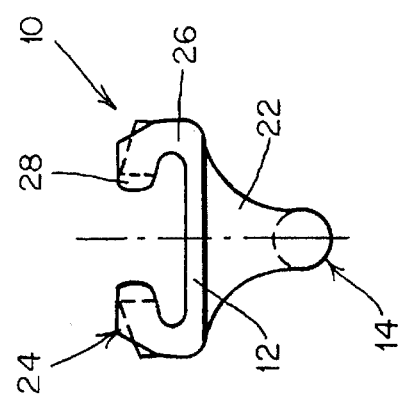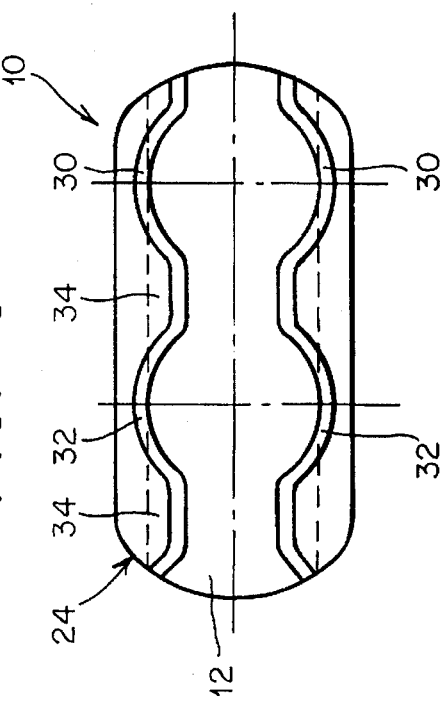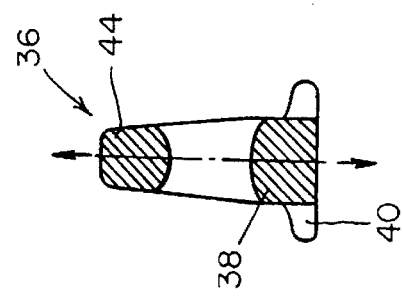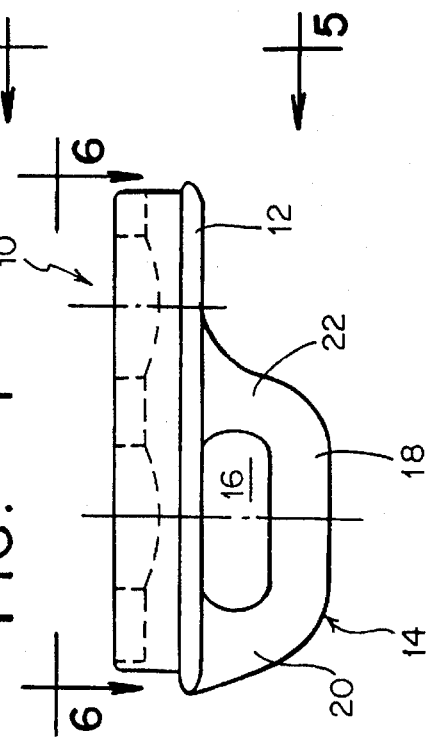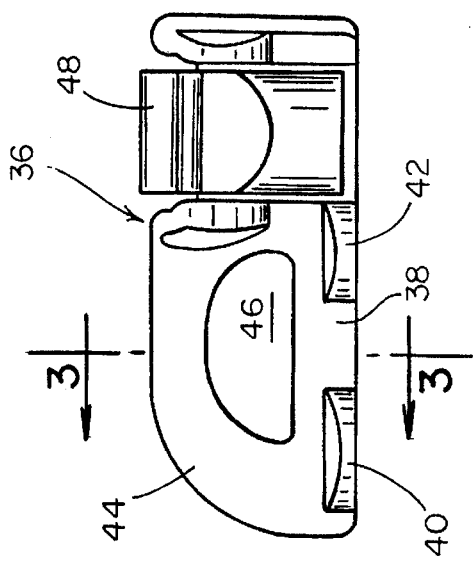

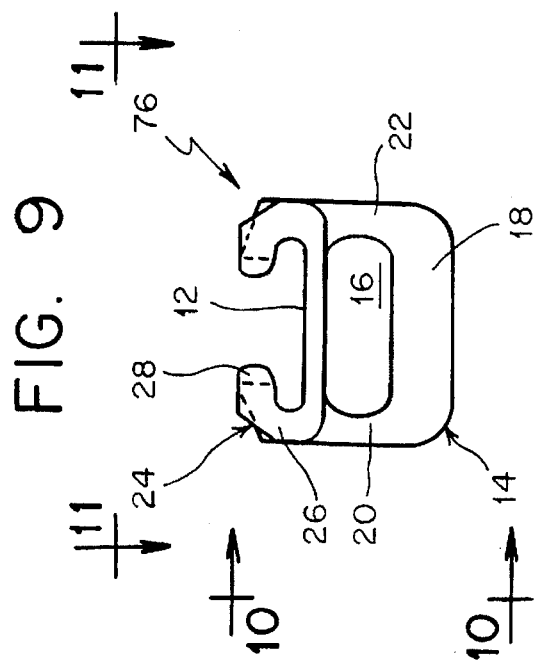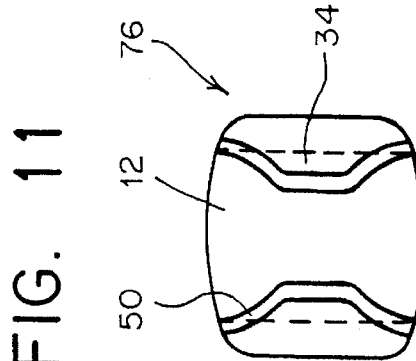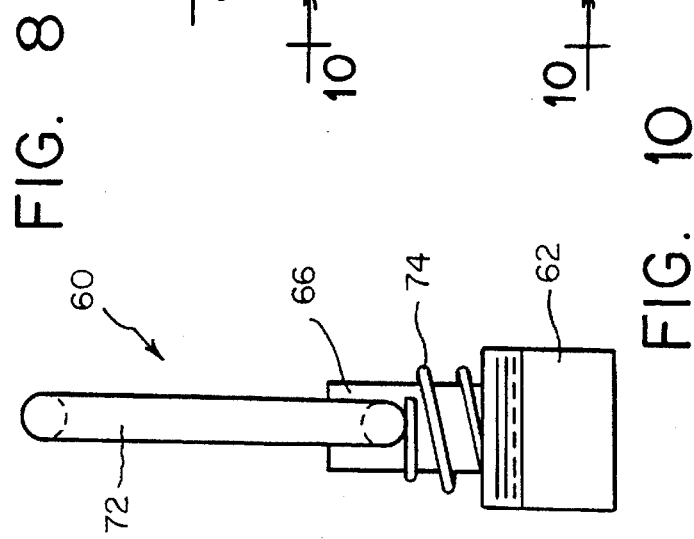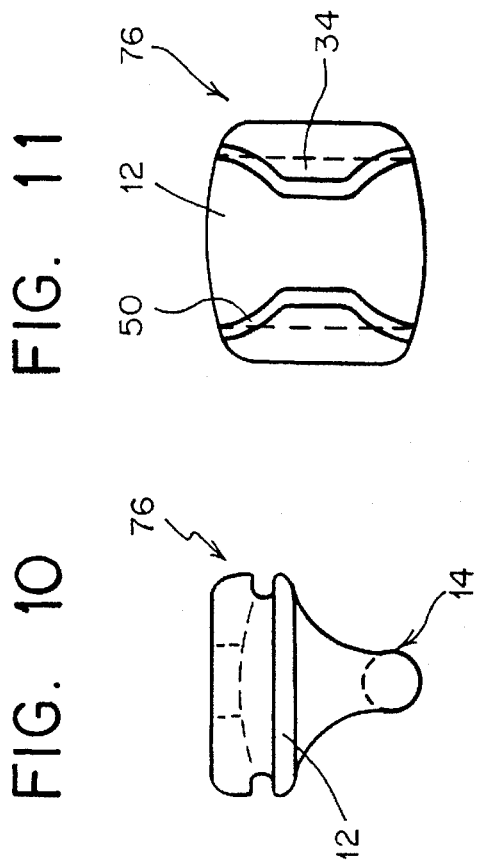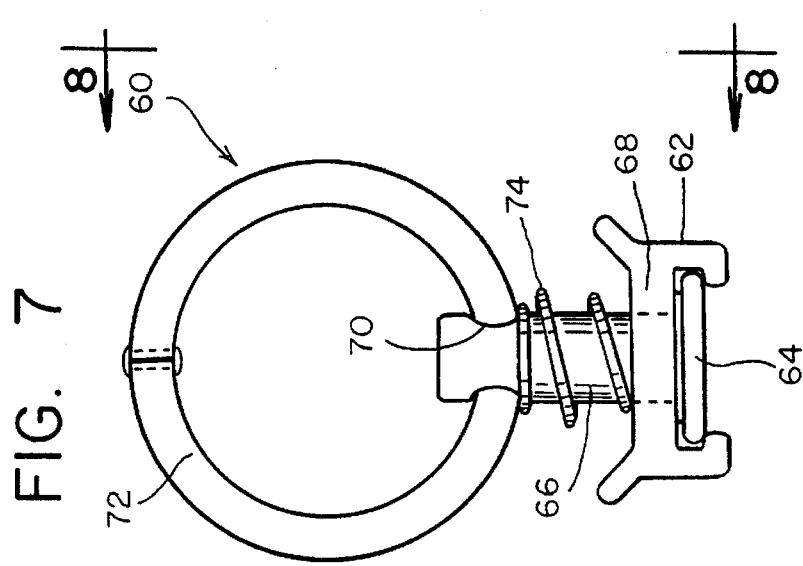

EXTENSION FITTING FOR A TENSION BELT

SPECIFICATION

The invention relates to an extension fitting for a tension belt, to which a belt anchor is affixed, which can be made to engage with the holder profile of a counterpiece, so as to be released again.

Such belts are used in order to secure air freight in an airplane. Freight planes have holder profiles to hold belt anchors on bearing parts of the fuselage. Likewise, the freight pallets that are used have holder profile rails all around to hold the belt anchors.

The belts have standard lengths, which can be too short for certain applications. According to the state of the art, there are only makeshift solutions for extending the belts, and these do not satisfactorily fulfill the high safety demands. These makeshift solutions are accompanied by the risk of transport damage.

It is the task of the invention to create an extension fitting which allows secure tension belt lengthening, particularly for air freight use, while offering a high level of operating convenience.

This task is accomplished with an extension fitting which consists of a plate with the holder profile and an eye for affixing an extension belt. The extension belt can be a standard tension belt similar to the belt that is being extended.

In a preferred embodiment, the eye is arranged on the side of the plate opposite the holder profile.

A belt anchor in the form of a belt end fitting also has an eye for affixing the belt. The eye of the extension fitting is preferably arranged in the plate in such a manner that it lies opposite the eye of a belt anchor fixed in the holder profile. Tension forces which act on the belts are thus optimally transferred with the extension fitting.

The plate of the extension fitting is preferably essentially rectangular. The holder profile can consist of two claws which start at opposite sides of the plate and are directed towards each other, which essentially have a C profile.

The belt anchor preferably has a foot which fits between the claws of the holder profile, with at least one anchor mushroom which projects from it on both sides. The head of the anchor mushroom fits into the C profile of the claws. The claws are provided with at least one recess and/or widened region to introduce the anchor mushroom.

The belt anchor can have a single mushroom. The claws of the extension fitting then preferably have widened regions on both sides, in the longitudinal direction of the profile, through which the head of the anchor mushroom can be introduced into the holder profile.

However, the belt anchor can also have two mushrooms. Preferably, the claws are then provided with two recesses, offset in the longitudinal direction of the profile, through which the heads of the two anchor mushrooms can be introduced into the holder profile.

Finally, the belt anchor can also have three mushrooms. Preferably, the claws are then provided with three recesses, offset in the longitudinal direction of the profile, through which the heads of the three anchor mushrooms can be introduced into the holder profile.

The anchor mushrooms and a bolt of the belt anchor can be circular. The recesses of the claws are preferably circle segments which lie across from one another in pairs, the periphery of which lies on a common circle.

Figure 15:
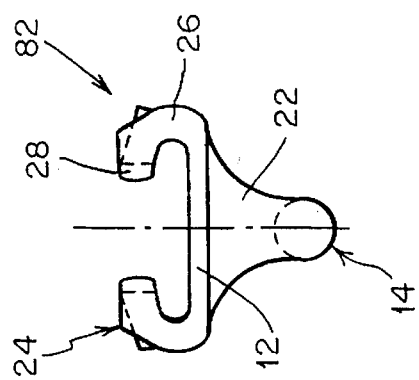
Figure 13:
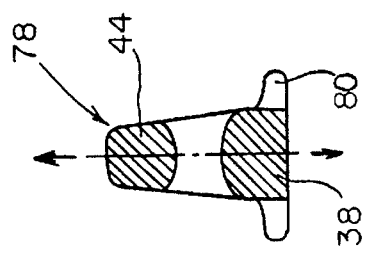
Figure 12:
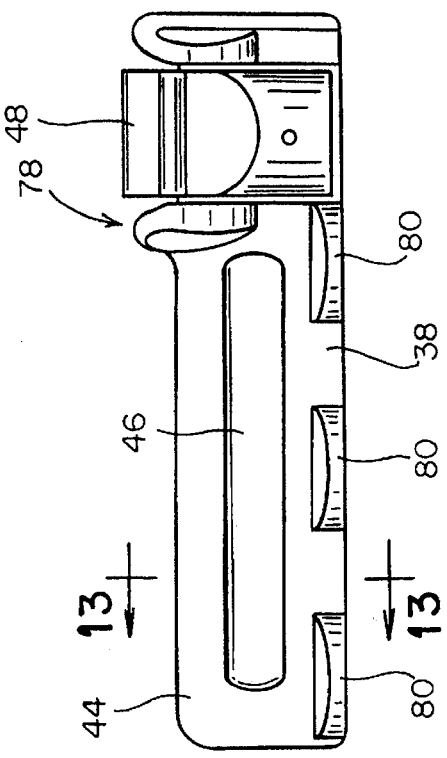
Figure 16:
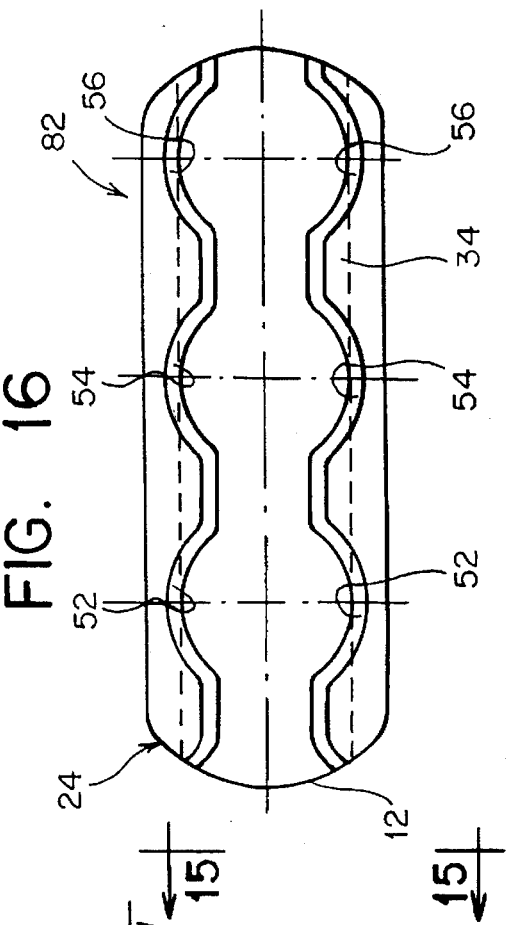
Figure 14:
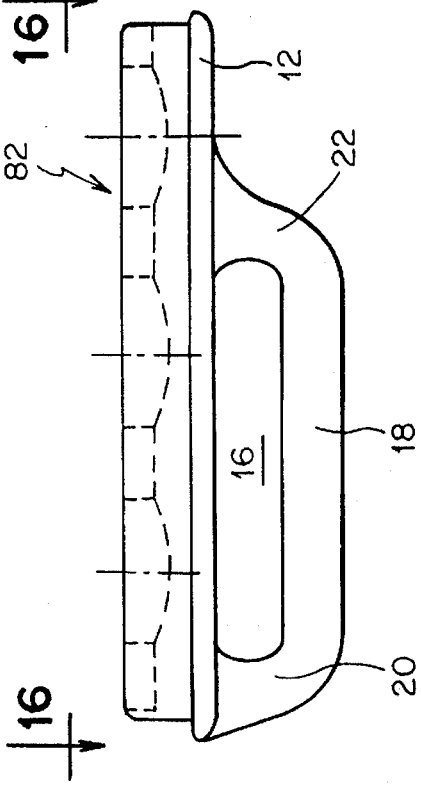

The invention is explained in more detail below, on the basis of the embodiments shown in the drawing, which shows:

FIG. 1 a perspective view of a two-mushroom belt anchor and an extension fitting which works together with it;

FIG. 2 a side view of the two-mushroom belt anchor;

FIG. 3 a cross-section through the two-mushroom belt anchor along the line III—III in FIG. 2;

FIG. 4 a side view of the extension fitting which works together with the two-mushroom belt anchor;

FIG. 5 a front view of the extension fitting with the view in the direction V of FIG. 4;

FIG. 6 a top view of the extension fitting with the view in the direction VI of FIG. 4;

FIG. 7 a front view of a single-mushroom belt anchor;

FIG. 8 a side view of the single-mushroom belt anchor with the view in the direction VIII of FIG. 7;

FIG. 9 a front view of an extension fitting which works together with the single-mushroom belt anchor;

FIG. 10 a side view of the extension fitting with the view in the direction X of FIG. 9;

FIG. 11 a top view of the extension fitting with the view in the direction XI of FIG. 9;

FIG. 12 a side view of a three-mushroom belt anchor;

FIG. 13 a cross-section through the three-mushroom belt anchor along the line XIII—XIII in FIG. 12;

FIG. 14 a side view of the extension fitting which works together with the three-mushroom belt anchor;

FIG. 15 a front view of the extension fitting with the view in the direction XV o FIG. 14; and FIG. 16 a top view of the extension fitting with the view in the direction XVI of FIG. 14.

The extension fitting 10 shown in FIG. 1 and FIG. 4 to FIG. 6 consists of a longish rectangular plate 12, which is ovally rounded at the ends. At the bottom of the plate 12, a stirrup 14 is arranged in the center longitudinal plane, which forms an eye 16 for affixing a belt, together with the plate 12. The stirrup 14 has the basic shape of a trapezoid. Its stirrup back 18, which consists of round material, essentially extends parallel to the plate 12. The stirrup shanks 20, 22 are inclined in the longitudinal direction on both sides, and are widened in the longitudinal and the lateral direction like a rounded pyramid. One stirrup shank 20 starts on one lateral side of the plate 12, and the other stirrup shank 22 starts approximately in the middle of the plate.

On the top of the plate 12, a holder profile is formed, which consists of two claws 24 which extend along the longitudinal sides of the plate 12, over its length. The claws 24 have a C profile, the C back 26 of which extends upwards, perpendicular to the plane of the plate, on the longitudinal plane side, and makes a transition to a C shank 28, which projects inward above the plane of the plate, so that the C shanks 28 are directed towards each other. There is a gap remaining between the C shanks 28. In total, the holder profile has a T profile opening which extends in the longitudinal direction of the plate.

The C shank 28 of the claws 24 are each provided with two recesses 30, 32 which are offset in the longitudinal direction of the plate and have the shape of circle segments. The recesses 30, 32 lie across from one another in pairs. The outer periphery of each pair of recesses 30, 32 lies on a common circle around an axis perpendicular to the plane of the plate. A rear pair of recesses 30 is located close to the lateral side of the plate 12 which lies opposite the start of the stirrup 14. The front pair of recesses 32 is arranged at about two-thirds of the plate length, farther away from the other lateral side. In front of the front pair of recesses 32 as well as between the pairs of recesses 30, 32, the C shanks 28 of the claws 24 form holder ridges 34.

The belt anchor 36 shown in FIG. 1 to FIG. 3 engages in the holder profile. The belt anchor 36 has a foot 38 which fits between the claws 24 of the holder profile. Lugs 40, 42 which project outward on both sides start in the bottom region of the foot 38; these have the shape of circle segments. Two pairs of lugs 40, 42 which lie opposite each other are provided, offset in the longitudinal direction; their periphery lies on a common circle. Each pair of lugs 40, 42 forms an anchor mushroom of the two-mushroom belt anchor 36.

The holder profile of the extension fitting 10 is dimensioned in such a way that the anchor mushrooms fit into the recesses 30, 32 of the claws 24 as well as into their C profile openings, i.e. below the holder ridges 34, with play.

A stirrup 44 proceeds upwards from the ridge 34 of the belt anchor 36, which stirrup forms an eye 46 to affix a belt, together with the ridge 34. Behind the stirrup 44, a guide for a bolt 48 is molded onto the ridge 34. The bolt 48 is round, is guided on the ridge 34 so as to be adjustable in height, and held down by a spring.

To lengthen the belt the belt anchor 36 is inserted into the holder profile recesses 30, 32 of the extension fitting 10 with its anchor mushrooms. In an initial slanted position, the bolt 48 rests against the top of the holder profile. By pressing the belt anchor 36 down and pushing it forward, the bolt 48 is raised against the force of the spring, until it engages in the rear pair of recesses 30. In the engaged position, the anchor mushrooms are below the holder ridges 34 of the claws 24. The eyes 16, 46 of the belt anchor 36 and the extension fitting 10 lie opposite one another.

FIG. 7 and FIG. 8 show a single-mushroom belt anchor 60 with a T profile shaped guide piece 62, in the profile opening of which a circular anchor mushroom 64 is held. The anchor mushroom 64 is seated on a cylindrical shaft 66, which projects into the profile back 68 of the guide piece 62 through a guide bore. The outer end of the shaft is drilled open and a ring-shaped eye 72 is set into the bore 70. A spiral pressure spring 74 which surrounds the shaft 66, which rests against the profile back outside of the guide piece 62 on the one end and on the eye 72 on the other end puts pressure on the anchor mushroom 64 in a position in which it rests against the inside edge of the profile back of the guide piece 62.

FIG. 9 to FIG. 11 show an extension fitting 76 for the single-mushroom belt anchor 60. The extension fitting 76 is significantly shorter than the extension fitting 10 described before. The basic outline of its plate 12 is approximately square. The holder profile of the extension fitting 76 has holder ridges 34 in the center and widened regions 50 on both sides, through which the anchor mushroom 64 of the belt anchor can be introduced into the holding position. The extension fitting 76 fits into the T profile opening of the single-mushroom belt anchor 60. For the remainder, the previous description applies analogously.

FIG. 12 and 13 show a three-mushroom belt anchor 78, which is longer than the two-mushroom belt anchor and is provided with three instead of two anchor mushrooms 80, but otherwise is essentially the same in construction as the two-mushroom belt anchor 36.

FIG. 14 to FIG. 16 show an extension fitting 82 for the three-mushroom belt anchor 78. The extension fitting 82 is longer than the extension fitting 10 for the two-mushroom belt anchor 36. Its holder profile has three pairs of recesses 52, 54, 56 for the three anchor mushrooms 80 of the belt anchor 78. For the remainder, the previous description applies analogously.

List of Reference Symbols 10 extension fitting
12 plate
14 stirrup
16 eye
18 stirrup back
20 stirrup shank
22 stirrup shank
24 claw
26 C back
28 C shank
30 recess
32 recess
34 holder ridge
36 two-mushroom belt anchor
38 foot
40 lug
42 lug
44 stirrup
46 eye
48 bolt
50 widened region
52 recess
54 recess
56 recess
60 single-mushroom belt anchor
62 guide piece
64 anchor mushroom
66 shaft
68 profile back
70 bore
72 eye
74 spiral pressure spring
76 extension fitting
78 three-mushroom belt anchor
80 anchor mushroom
82 extension fitting

I claim:

1. An extension fitting for an extension clamping belt for use in a clamping belt assembly having a belt anchor with an eyelet for a clamping belt and a foot with at least one anchor mushroom having a laterally-extruding enlarged head, said extension fitting comprising:

a generally elongated plate having a top side, a bottom side, opposite longitudinal ends and opposite lateral ends;

two claws joined to opposite lateral ends of said plate and projected outwardly from one of said sides of said plate, each of said claws having free ends extending toward one another to define a slotted recess therebetween;

an eyelet attached to the other of said sides of said plate for an extension clamping belt, said eyelet being disposed on said other side of said plate such that it will be opposite said eyelet of said belt anchor which said enlarged head of said anchor mushroom is introduced in said slotted recess between said claws joined to said plate.

2. An extension fitting according to claim 1, wherein the said plate is substantially rectangular.

3. An extension fitting according to claim 1, wherein said claws each have a generally C-shaped profile and cooperate to define a C-shaped opening therebetween.

4. An extension fitting according to claim 3, wherein said foot of said belt anchor fits between said claws, and said head of said anchor mushroom fits into said C-shaped opening defined by said claws.

5. An extension fitting according to claim 1, wherein said claws define at least one of said slotted recesses and are further provided with at least one widened recess opening adjacent to and communicating with said slotted recess for removably introducing said anchor mushroom into said slotted recess.

6. An extension fitting according to claim 1, wherein said belt anchor has a single mushroom, and said claws have a pair of widened recess openings on both sides of said slotted recess, arranged in the longitudinal direction of said plate.

7. An extension fitting according to claim 1, wherein said belt anchor has two spaced-apart mushrooms, and said claws are provided with two recess openings, spaced apart longitudinally in the longitudinal direction of said plate, for introducing the two mushroom anchors.

8. An extension fitting according to claim 1, wherein said belt anchor has three spaced-apart mushrooms, and said claws are provided with three recess openings, spaced apart longitudinally in the longitudinal direction of the said plate, for introducing the three mushroom anchors.

9. An extension fitting according to claim 1, wherein said recess openings each comprise a pair of circular segments which lie opposite one another, the periphery of each pair of which lies on a common circle.

* * * * *